United States Patent
Okuda

(10) Patent No.: US 9,862,415 B2
(45) Date of Patent: Jan. 9, 2018

(54) LANE KEEPING ASSIST APPARATUS

(71) Applicant: TOYOTA JIDOSHA KABUSHIKI KAISHA, Toyota-shi, Aichi (JP)

(72) Inventor: Yuji Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 14/896,245

(22) PCT Filed: Jun. 30, 2014

(86) PCT No.: PCT/JP2014/067997
§ 371 (c)(1),
(2) Date: Dec. 4, 2015

(87) PCT Pub. No.: WO2015/012090
PCT Pub. Date: Jan. 29, 2015

(65) Prior Publication Data
US 2016/0129938 A1    May 12, 2016

(30) Foreign Application Priority Data
Jul. 22, 2013  (JP) .................. 2013-151947

(51) Int. Cl.
*B62D 15/02*  (2006.01)
*B60W 50/10*  (2012.01)
(Continued)

(52) U.S. Cl.
CPC ......... *B62D 15/025* (2013.01); *B60W 10/184* (2013.01); *B60W 10/20* (2013.01);
(Continued)

(58) Field of Classification Search
None
See application file for complete search history.

(56) References Cited

U.S. PATENT DOCUMENTS

2003/0097206 A1\*  5/2003  Matsumoto .......... B62D 15/025
                                                    701/1
2005/0267684 A1   12/2005  Kawakami et al.
(Continued)

FOREIGN PATENT DOCUMENTS

DE    102006058413 A1   6/2008
JP    2005112101 A      4/2005
(Continued)

OTHER PUBLICATIONS

Hans; Machine translation of WO 2006081936; Aug. 2006, espacenet.com.\*

*Primary Examiner* — John Olszewski
*Assistant Examiner* — David P. Merlino
(74) *Attorney, Agent, or Firm* — Oliff PLC

(57) ABSTRACT

A lane keeping assist apparatus is disclosed which includes a lane detecting part that detects a lane in which a vehicle travels; an actuator that generates a force for changing an orientation of the vehicle; and a controller that operates the actuator such that the vehicle travels within the lane under a situation where a lane keeping assist function is in its ON state, wherein under a situation where the controller is operating the actuator, the controller determines whether an operation amount of the actuator is less than a predetermined first threshold, and prevents an output of operation information if it determines that the operation amount of the actuator is less than the predetermined first threshold, the operation information representing an operated state of the actuator.

6 Claims, 11 Drawing Sheets

(51) Int. Cl.
*B60W 50/14* (2012.01)
*B60W 10/184* (2012.01)
*B60W 10/20* (2006.01)
*B60W 30/12* (2006.01)
*B60W 50/00* (2006.01)

(52) U.S. Cl.
CPC ............ *B60W 30/12* (2013.01); *B60W 50/10* (2013.01); *B60W 50/14* (2013.01); *B60W 2050/0095* (2013.01); *B60W 2540/18* (2013.01)

(56) References Cited

U.S. PATENT DOCUMENTS

| | | | |
|---|---|---|---|
| 2009/0187313 A1* | 7/2009 | Kawakami | ........... B62D 15/025 701/45 |
| 2012/0072097 A1 | 3/2012 | Ohta et al. | |
| 2012/0239253 A1* | 9/2012 | Schmidt | ............... B62D 15/025 701/41 |
| 2015/0039186 A1* | 2/2015 | Okuda | .................. B60W 50/14 701/41 |
| 2015/0352956 A1* | 12/2015 | Miuchi | .............. B62D 15/0295 701/41 |

FOREIGN PATENT DOCUMENTS

| | | |
|---|---|---|
| JP | 2005-343259 A | 12/2005 |
| JP | 2010137778 A | 6/2010 |
| JP | 2011-001049 A | 1/2011 |
| WO | WO 2006081936 A1 * | 8/2006 ........... B62D 15/025 |

* cited by examiner

FIG.2
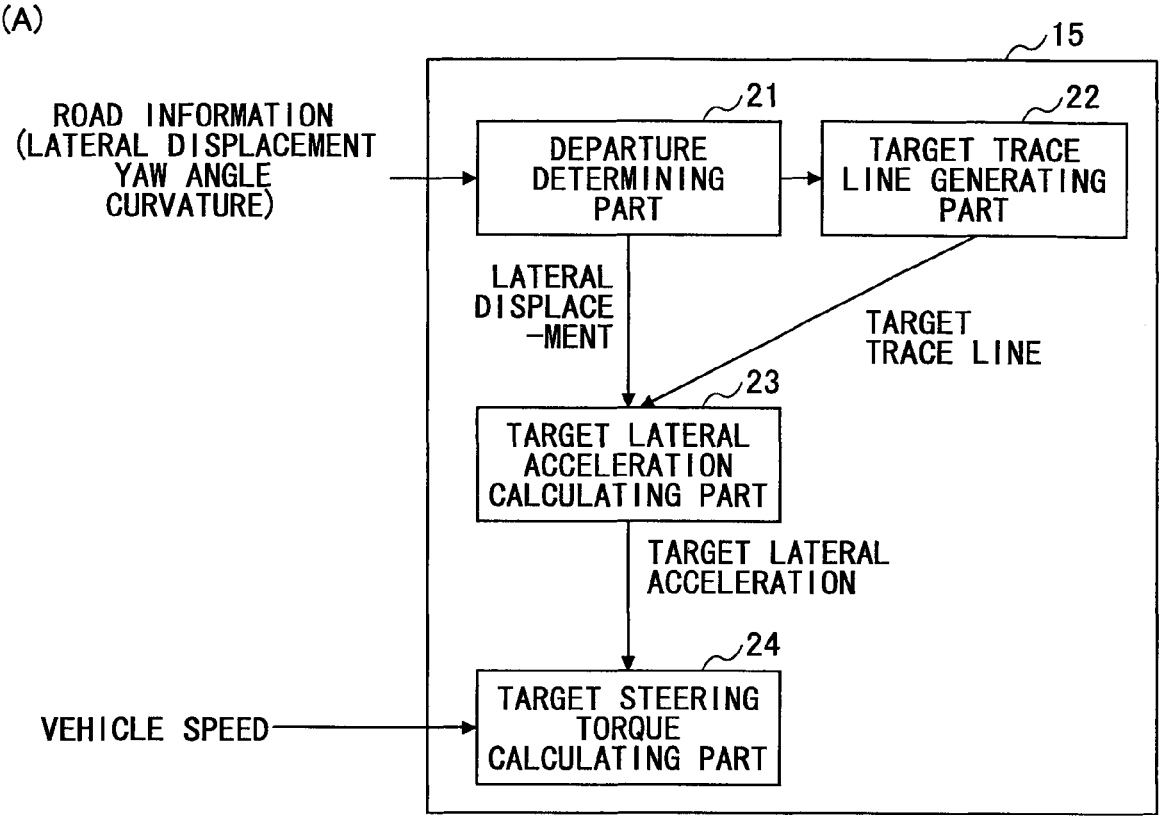
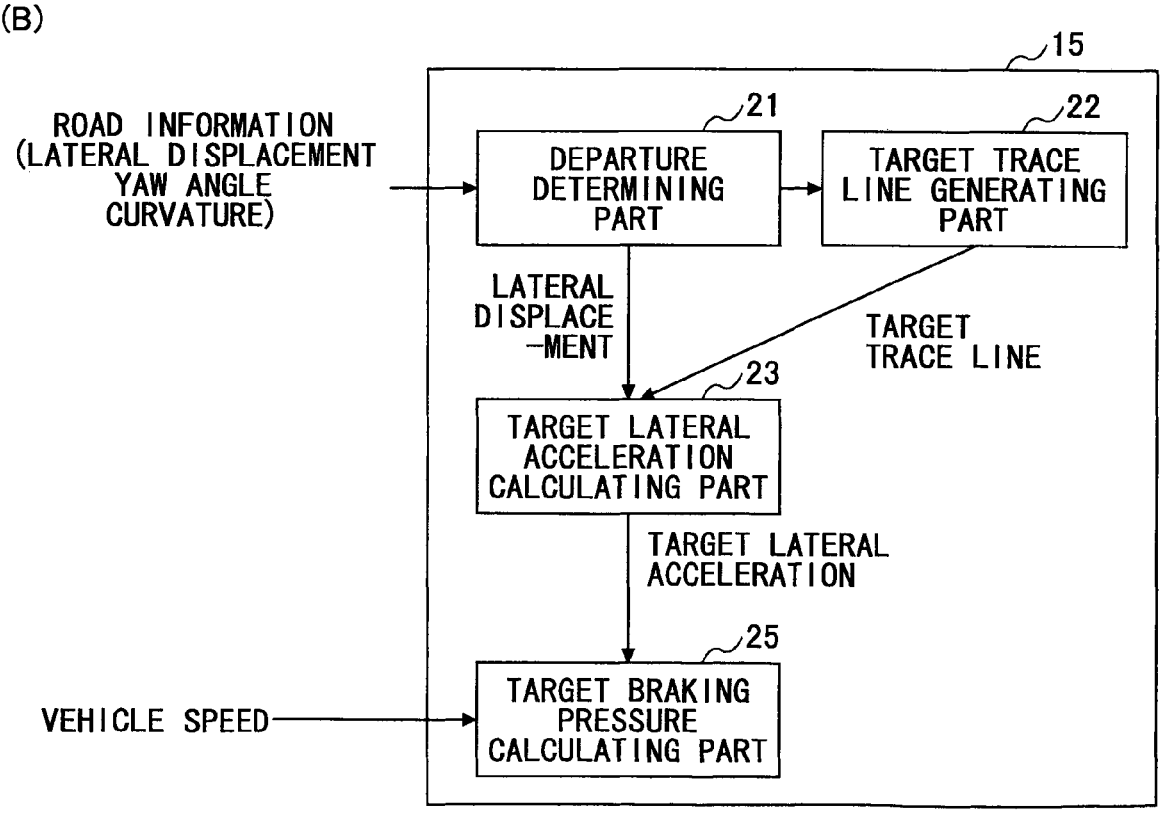

FIG.10
(A)
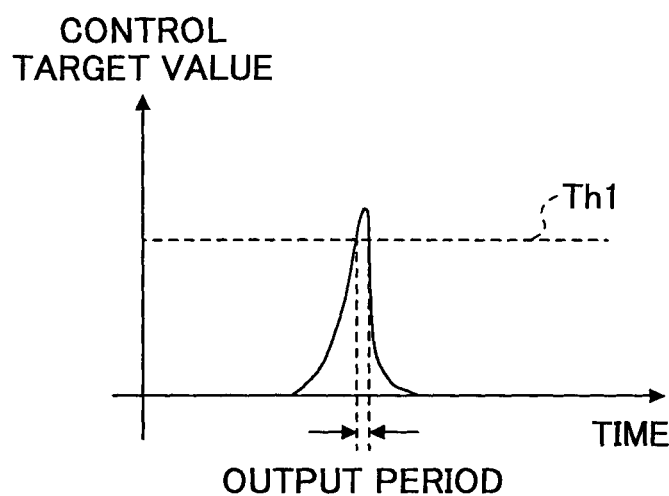
(B)
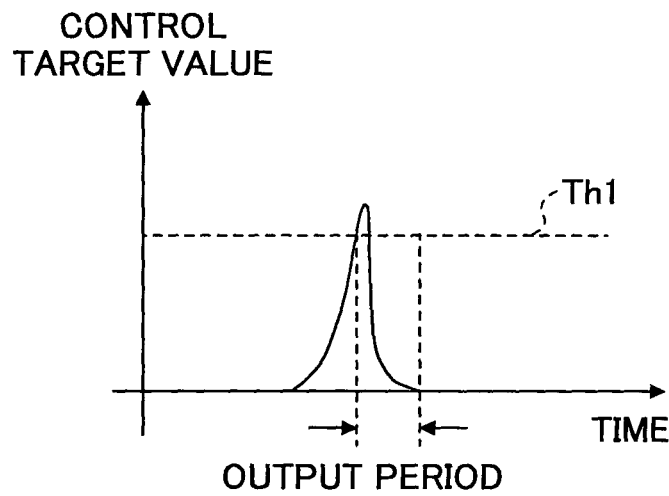

LANE KEEPING ASSIST APPARATUS

TECHNICAL FIELD

The disclosure is related to a lane keeping assist apparatus.

BACKGROUND ART

A lane keeping assist apparatus is known in which an arrow in a direction against a departure direction, when a lane departure prevention control is operated, is displayed, and a size (including a length and a width) and a color of the arrow is changed according to a predominance degree of a driver on vehicle traveling. The higher the predominance degree of a driver becomes the less the intervention degree of a control, and thus the high predominance degree of a driver means a state in which a behavior of a vehicle depends on the operation of the driver.

[Patent Document 1] Japanese Laid-open Patent Publication No. 2011-001049

DISCLOSURE OF INVENTION

Problem to be Solved by Invention

In general, when an actuator is operated in a lane keeping assist control such as a lane departure prevention control, information representing an operated state of the actuator is output. According to this information, a user can understand that the actuator is operated by the lane keeping assist control. The lane keeping assist control includes an intervention control involving a change in a direction of a vehicle. The user cannot perceive the operation of the actuator when the operation amount of the actuator is small at the time of the intervention control. In such a case, if the information representing an operated state of the actuator, the user may feel that something is wrong.

Therefore, an object of this disclosure is to provide a lane keeping assist apparatus that can appropriately prevent an output of operation information representing an operated state of an actuator under a situation where the actuator is being operated.

Means to Solve the Problem

According to one aspect of the disclosure, a lane keeping assist apparatus is provided, which includes:
- a lane detecting part that detects a lane in which a vehicle travels;
- an actuator that generates a force for changing an orientation of the vehicle; and
- a controller that operates the actuator such that the vehicle travels within the lane under a situation where a lane keeping assist function is in its ON state, wherein
- under a situation where the controller is operating the actuator, the controller determines whether an operation amount of the actuator is less than a predetermined first threshold, and prevents an output of operation information if it determines that the operation amount of the actuator is less than the predetermined first threshold, the operation information representing an operated state of the actuator.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

Advantage of the Invention

According to one aspect of the disclosure,

BRIEF DESCRIPTION OF DRAWINGS

FIG. 2 (A) is an example of a block diagram of a controller 15 when it performs an intervention control with a driver steering torque (steering force), and FIG. 2 (B) is an example of a block diagram of the controller 15 when it performs the intervention control with a braking force.

FIG. 10 is a diagram for explaining the process in FIG. 9.

Figure 1:
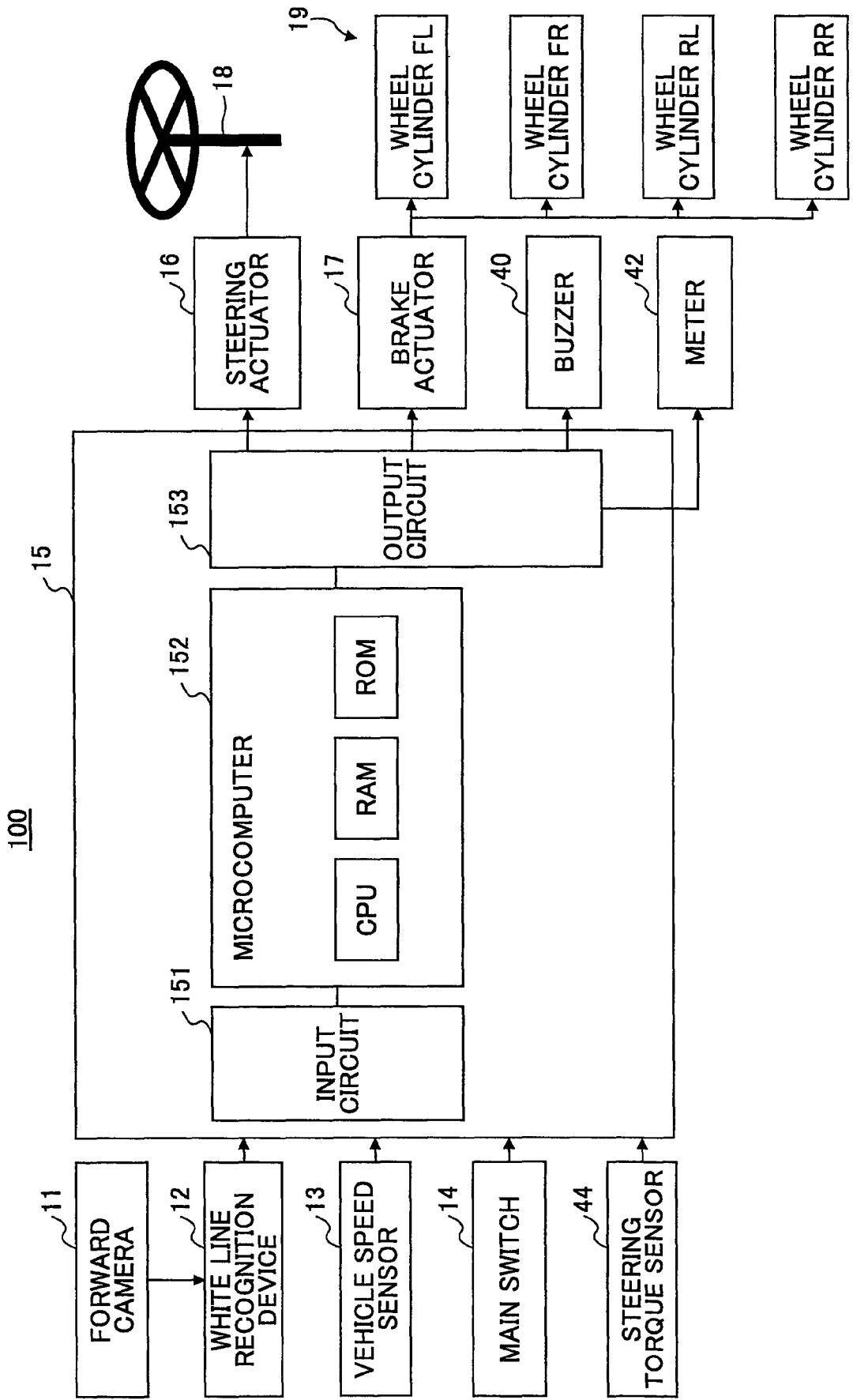
FIG. 1 is a diagram for schematically illustrating a configuration of a lane keeping assist apparatus according to an embodiment.

DESCRIPTION OF REFERENCE SYMBOLS 11 forward camera
12 white line recognition device
14 main switch
15 controller
16 steering actuator
17 brake actuator
18 steering shaft
100 lane keeping assist apparatus

BEST MODE FOR CARRYING OUT THE INVENTION

In the following, embodiments are described in detail with reference to appended drawings.

FIG. 1 is a diagram for schematically illustrating a configuration of a lane keeping assist apparatus 100 according to an embodiment. In the example illustrated in FIG. 1, the lane keeping assist apparatus 100 includes a forward camera 11, a white line recognition device 12, a vehicle speed sensor 13, a main switch 14, a controller 15, a steering actuator 16, a brake actuator 17, a buzzer 40 and a meter 42.

The forward camera 11 may be a single camera or a stereo camera that captures a scene around the vehicle that mainly includes a predetermined region in front of the vehicle. Photoelectric conversion elements of the forward camera 11 may be CCDs (charge-coupled devices), CMOSs (complementary metal oxide semiconductors), etc. The forward camera 11 may output image data, which obtained by capturing the scene in front of the host vehicle, to the white line recognition device 12. The operation for capturing the scene in front of the host vehicle may be performed periodically at a predetermined frame rate (30 through 60 frames per sec, for example).

The white line recognition device 12 may recognize a lane boundary sign from the image data to calculate road information. The lane boundary sign represents a road surface sign for delimiting (defining) a traveling lane. For example, the lane boundary sign is a line-shaped sign formed by applying paint which can be recognized from a road surface, such as white paint, in line shape along the road. Further, there is a white line formed in a chromatic color such as yellow or orange, depending on a road rule or a nation. Further, the lane boundary sign includes, in addition to a line-shaped sign, a dotted line or a broken line which has portions in which paint is not applied at a predetermined interval. Further, when the traveling lane is delimited by a three-dimensional object such as bots dots in the United States of America, instead of the paint, such a three-dimensional object is also included in the lane boundary sign. Further, when the traveling lane is delimited by arranging light emitting objects such as lamps or cat's eye along the road, these objects are also included in the lane boundary sign.

Further, the road information may include an angle (yaw angle) φ between a direction of the traveling lane of the vehicle and a forward and backward direction of the vehicle; a lateral displacement X from the center of the traveling lane to the center of the vehicle; and a curvature β of the traveling lane. The white line recognition device 12 outputs the road information, which is calculated from the image data, to the controller 15. It is noted that the curvature β of the traveling lane may be derived by scanning luminance information in a horizontal direction on a predetermined interval basis of the imaged data in the vertical direction, detecting horizontal edges with strength greater than a predetermined value, and applying curve fitting (a least squares method or the like) to positions of the detected edges. It is noted that a part or a whole of functions of the white line recognition device 12 may be implemented by the control calculating part 15.

The wheel speed sensor 13 may detect respective wheel speeds of a left front wheel FL, a right front wheel FR, a left rear wheel RL and a right rear wheel RR. The controller 15 may adopt an average of two wheel speeds of the driven wheels, among the respective wheel speeds of the wheels, as a vehicle speed of the vehicle. It is noted that the vehicle speed may be calculated based on a rpm of an output shaft of a transmission, a history of vehicle position measurements from a GNSS (global navigation satellite system) receiver, etc.

The main switch 14 is to be operated by a user. The main switch 14 may be provided at any location within a cabin. The main switch 14 may be a mechanical switch or a touch switch. The main switch 14 is an interface with which the user inputs an intention whether to perform the lane keeping assist control described hereinafter to the lane keeping assist apparatus 100. As an example, it is assumed hereinafter that the main switch 14 is turned on when the user expresses an intention to perform the lane keeping assist control. It is noted that a display for informing an ON/OFF status of the main switch 14 (i.e., an ON/OFF status of the lane keeping assist control) may be output in a meter 42.

The steering actuator 16 may include arbitrary configuration for generating the steering torque (steering force). The steering actuator 16 may be a motor that is used for an assist control for adding an assist torque in the steering direction of the driver. For example, the steering actuator 16 may be provided in a steering gear box such that the steering actuator 16 is coaxial with a steering rack (not illustrated). In this case, the steering actuator 16 may be engaged with the steering rack via a ball screw nut. In this case, the steering actuator 16 assists a movement of the steering rack with a driving force thereof. A driver steering torque sensor 44 for detecting a driver steering torque of the user may be provided on the steering shaft 18. The steering actuator 16 generates a steering torque instructed based on a target trace line, as described hereinafter. With this arrangement, it becomes possible to generated the steering torque for keeping the lane (for the departure prevention, for example).

The brake actuator 17 is connected to wheel cylinders 19 (referred to as wheel cylinders FL through RR, hereinafter) which are provided in the respective wheels. In order to independently control a braking pressure on a wheel basis, the brake actuator 17 adjusts the degree of opening of solenoid valves disposed in fluid channels for brake fluid to control wheel cylinder pressures of the wheel cylinders FL through RR. With this arrangement, it is possible to apply arbitrary yaw moment to the vehicle body. With this arrangement, it becomes possible to generated a braking force (and thus a yaw rate) for keeping the lane (for the departure prevention, for example).

The controller 15 may be formed by a single or a plurality of an electronic control unit. The controller 15 includes a microcomputer 152, an input circuit 151 and an output circuit 153, for example. In this case, functions described hereinafter are implemented when a CPU of the microcomputer 152 executes programs.

The controller 15 performs the lane keeping assist control based on road information. The lane keeping assist control may include an alert control via an information output device such as the buzzer 40 or the meter 42, and an intervention control for changing an orientation of the vehicle via the steering actuator 16 and the brake actuator 17. Alternatively, the lane keeping assist control may include the intervention control.

The alert control may be implemented in various manners. For example, an alarm output condition of the alert control may be the same as an operation condition of the lane keeping assist control described hereinafter. Alternatively, the alarm output condition of the alert control may be different from the operation condition of the lane keeping assist control described hereinafter. For example, the intervention control may be performed before the wheel of the vehicle steps on the lane boundary sign, while the alert control may be performed when the wheel of the vehicle steps on the lane boundary sign. Further, the output manner of the alert is also arbitrary. The alert may be a visual alert displayed on the meter 42, an acoustic alert output by the buzzer 40, a vibration, or any combination thereof.

The intervention control may be implemented in various manners. For example, the intervention control may be the same as a LKA (Lane Keeping Assist) that supports a driver's steering operation such that the vehicle travels to keep the traveling lane, or a LDW (Lane Departure Warning) that is operated when the departure from the traveling lane is detected or the like. According to the LKA, the steering torque and the braking force are always assisted according to the lateral displacement with respect to the target traveling line (traveling lane center), the yaw angle, etc., and, when the departure tendency is detected, the departure reduction with the steering torque or the yaw moment is performed. According to the LDW, when the departure tendency is detected, the departure reduction with the steering torque or the yaw moment is performed. It is noted that at the time of the intervention control both of or any one of the steering torque or the yaw moment may be generated.

FIG. 2 (A) is an example of a block diagram of the controller 15 when it performs the intervention control with the driver steering torque (steering force), and FIG. 2 (B) is an example of a block diagram of the controller 15 when it performs the intervention control with the braking force.

In the example illustrated in FIG. 2 (A), the controller 15 includes a departure determining part 21, a target trace line generating part 22, a target lateral acceleration calculating part 23 and a target steering torque calculating part 24.

The departure determining part 21 determines whether the vehicle departs from the traveling lane. The departure determination may be implemented by any methods. For example, a departure prediction time is calculated based on the lateral displacement X of the vehicle and detects the departure tendency (departure) if the departure prediction time becomes less than or equal to a threshold.

The target trace line generating part 22, if it is determined that the vehicle departs from the traveling lane, generates the target trace line for reducing the departure. The target trace line may include two lines of a first line and a second line. In this case, the first line is used for the departure reduction and the second line is used for modifying the direction of the vehicle after the departure reduction. The second line may be set substantially straight at the exit of the curve.

The target lateral acceleration calculating part 23, if it is determined that the vehicle departs from the traveling lane, calculates a target lateral acceleration such that the vehicle travels along the target trace line. For example, the target lateral acceleration may be calculated as follows, for example.

Target lateral acceleration $Gx = G1 \times V^2 \times \beta + G2 \times \varphi + G3 \times X$ G1 is a feed-forward operator (gain), G2 is a feed-back operator and G3 is a feed-back operator. It is noted that the described calculation method is just one example. The target lateral acceleration may be calculated from the lateral displacement X and the yaw angle $\varphi$ only, or a speed is included in the feed-back term of the yaw angle $\varphi$. Further, as a simple example, the target lateral acceleration may be read from a map in which the target lateral acceleration Gx is associated with the lateral displacement X and the yaw angle $\varphi$.

The target steering torque calculating part 24 calculates a target steering torque according to the target lateral acceleration. For example, the target steering torque calculating part 24 determines a gain K according to the vehicle speed, and calculates the target steering torque based on the target lateral acceleration and the gain K with the following formula.

Target steering torque $ST = K \times Gx$

The gain K is a function of the vehicle speed considering the fact that the steering torque need to trace the target trace line varies according to the vehicle speed.

In the example illustrated in FIG. 2 (B), the controller 15 includes a target braking pressure calculating part 25 instead of the target steering torque calculating part 24. The target braking pressure calculating part 25 calculates a target braking pressure according to the target lateral acceleration. For example, the target brake pressure calculating part 25 calculates a target brake torque based on the target lateral acceleration and the vehicle speed. Specifically, the target brake pressure calculating part 25 calculates a target cylinder pressure difference $\Delta Pf$ of the front wheels and a target cylinder pressure difference $\Delta Pr$ of the rear wheels based on the target lateral acceleration.

$\Delta Pf = 2 \times Cf \times (Gx - Th)/Tr$ $\Delta Pr = 2 \times Cr \times Gx/Tr$ Tr is a tread length, and Cf and Cr are conversion factors when the lateral acceleration is converted to the wheel cylinder pressure. Further, Th is a coefficient for making the target cylinder pressure difference $\Delta Pf$ of the front wheels less than the target cylinder pressure difference $\Delta Pr$ of the rear wheels. In the case of the outward departure, the target wheel cylinder pressure of the outward front wheel (front left wheel in the case of the left curve) is made greater than the target wheel cylinder pressure of the inward front wheel by the target cylinder pressure difference $\Delta Pf$, and the target wheel cylinder pressure of the outward rear wheel is made greater than the target wheel cylinder pressure of the inward rear wheel by the target cylinder pressure difference $\Delta Pr$. With this arrangement, the yaw moment is generated in the inward direction and the departure can be reduced. Further, in the case of the inward departure, the target wheel cylinder pressure of the outward front wheel (front right wheel in the case of the left curve) is made greater than the target wheel cylinder pressure of the inward front wheel by the target cylinder pressure difference $\Delta Pf$, and the target wheel cylinder pressure of the outward rear wheel is made greater than the target wheel cylinder pressure of the inward rear wheel by the target cylinder pressure difference $\Delta Pr$. With this arrangement, the yaw moment is generated in the outward direction and the departure can be reduced.

It is noted that the controller 15 may include both the target steering torque calculating part 24 and the target brake pressure calculating part 25. With this arrangement, the control can be performed by dividing the control amount for the departure reduction into the steering torque and the yaw moment.

Figure 3:
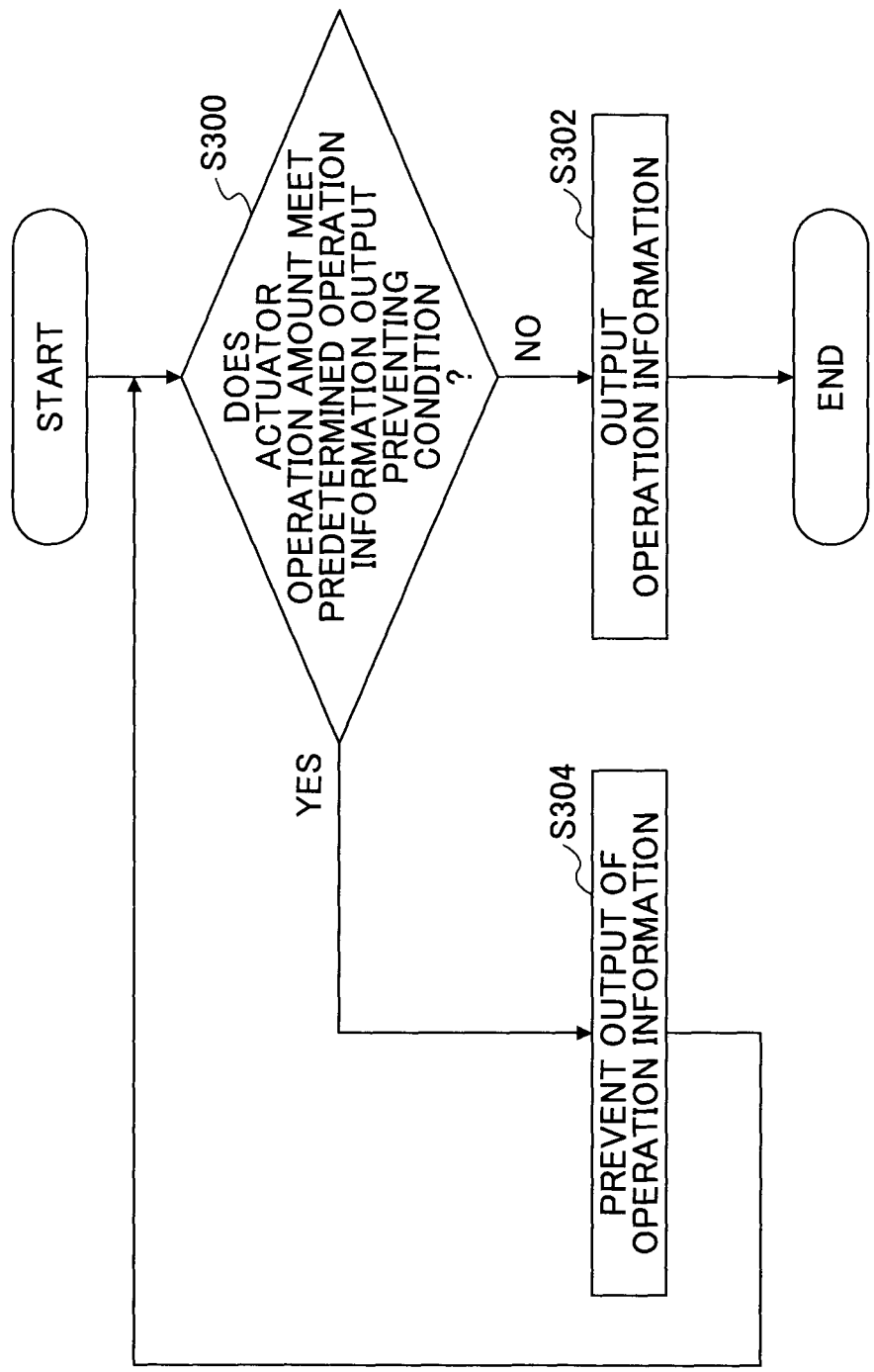
FIG. 3 is a diagram for illustrating an example of an operation information output process executed by the controller 15.

FIG. 3 is a diagram for illustrating an example of an operation information output process executed by the controller 15. The process routine illustrated in FIG. 3 may be performed repeatedly every predetermined cycle until the operation information is output, during the operation of the intervention control, for example. It is noted that "during the operation of the intervention control" means "during the operation of the steering actuator 16 and the brake actuator 17". It is noted that, in the following, for the sake of preventing a complicated explanation, it is assumed that the intervention control is performed by only the steering actuator 16 (see FIG. 2 (A)), unless otherwise specified. However, the same holds true for a configuration in which the intervention control is performed by only the brake actuator 17 or a configuration in which the intervention control is performed by the steering actuator 16 and the brake actuator 17.

In step 300, the controller 15 determines whether an operation amount of the steering actuator 16 meets a predetermined operation information output preventing condition. The predetermined operation information output preventing condition is arbitrary; however, preferably, the predetermined operation information output preventing condition is met when the operation amount of the steering actuator 16 is within such a range where the operation of the steering actuator 16 is not perceived by the driver. Such a range may be adapted by experiments, etc. It is noted that, as the operation amount of the steering actuator 16, a detected value of the sensor, a control target value, a drive current value applied to the steering actuator 16, etc., may be used. In the case of using the control target value as the operation amount of the steering actuator 16, in the case illustrated in FIG. 2 (A), for example, the target lateral acceleration Gx, the target steering torque ST, etc., may be used as the control target value of the steering actuator 16. If the operation amount of the steering actuator 16 meets the predetermined operation information output preventing condition, the process goes to step 304, otherwise the process goes to step 302.

In step 302, the controller 15 outputs the operation information that represents an operated state of the steering actuator 16 (i.e., information that directly or indirectly indicates that the steering actuator 16 is being operated). The way of outputting the operation information may be arbitrary. For example, the operation information may be a visual output on the meter 42 (an ON state of an indicator, for example), an acoustic output with the buzzer 40, a vibration, or any combination thereof.

In step 304, the controller 15 keeps a prevented state of the output of the operation information. In other words, the controller 15 prevents outputting the operation information in spite of the fact that the steering actuator 16 is being operated. For example, if the output of the operation information is a display on the meter 42, the display may not be output (i.e., non-displayed state). For example, if the output of the operation information is implemented by turning on the indicator in the meter 42, the indicator may be turned off. Further, if the output of the operation information is the acoustic output with the buzzer 40, the acoustic output may not be output. Further, if the output of the operation information is the vibration output which the user can perceive, the vibration may not be output.

In this way, according to the operation information outputting process illustrated in FIG. 3, the output of the operation information is prevented if the operation amount of the steering actuator 16 meets the operation information output preventing condition even if the steering actuator 16 is being operated. Thus, it becomes possible to reduce a situation where the user may feel that something is wrong, which otherwise would happen due to the output of the operation information, because the output of the operation information is prevented if the operation amount of the steering actuator 16 is within such a range that the operation of the steering actuator 16 is not perceived by the driver.

Figure 4:
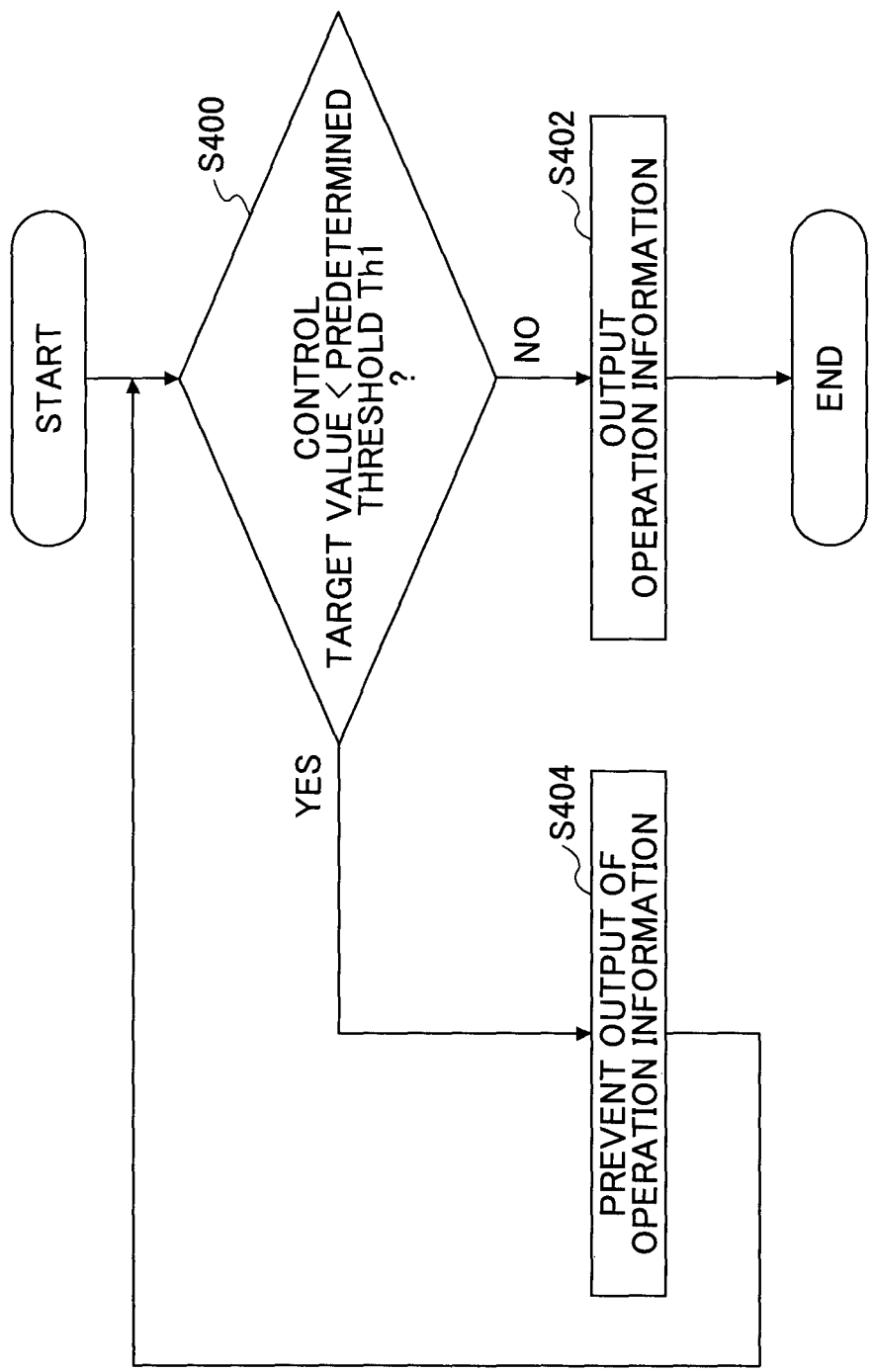
FIG. 4 is a diagram for illustrating another example of the operation information output process executed by a controller 15.

FIG. 4 is a diagram for illustrating another example of the operation information output process executed by the controller 15. The process routine illustrated in FIG. 4 may be performed repeatedly every predetermined cycle until the operation information is output, during the operation of the intervention control, for example.

In step 400, the controller 15 determines whether the control target value of the steering actuator 16 is less than a predetermined threshold Th1 (an example of the predetermined operation information output preventing condition used in step 300 in FIG. 3). As described above, in the case illustrated in FIG. 2 (A), for example, the target lateral acceleration Gx, the target steering torque ST, etc., may be used as the control target value of the steering actuator 16. The predetermined threshold Th1 may correspond to an upper limit value of a range in which the operation of the steering actuator 16 is not perceived by the driver, and may be adapted by experiments, etc. If the control target value of the steering actuator 16 is less than the predetermined threshold Th1, the process goes to step 404, and otherwise (i.e., if the control target value of the steering actuator 16 is greater than or equal to the predetermined threshold Th1) the process goes to step 402.

The processes of steps 402 and 404 may be the same as the processes of steps 302 and 304 illustrated in FIG. 3, respectively.

According to the operation information outputting process illustrated in FIG. 4, the output of the operation information is prevented if the control target value of the steering actuator 16 is less than the predetermined threshold Th1 even if the steering actuator 16 is being operated. Thus, it becomes possible to reduce a situation where the user may feel that something is wrong, which otherwise would happen due to the output of the operation information, because the output of the operation information is prevented if the operation amount of the steering actuator 16 is within such a range that the operation of the steering actuator 16 is not perceived by the driver.

It is noted that, in the case of a configuration in which the intervention control is performed by the brake actuator 17, it may be determined in step 400 in FIG. 4 whether a control target value of the brake actuator 17 is less than a predetermined threshold Th1. In the case illustrated in FIG. 2 (A), for example, the target lateral acceleration Gx, the target cylinder pressure difference, etc., may be used as the control target value of the brake actuator 17. Further, similarly, the predetermined threshold Th1 may correspond to an upper limit value of a range in which the operation of the brake actuator 17 is not perceived by the driver, and may be adapted by experiments, etc.

The predetermined threshold Th1 used in step 400 in FIG. 4 (and also a predetermined threshold Th1 used in step 802 in FIG. 9 described hereinafter) may be constant or varied according to a predetermined parameter.

Figure 5:
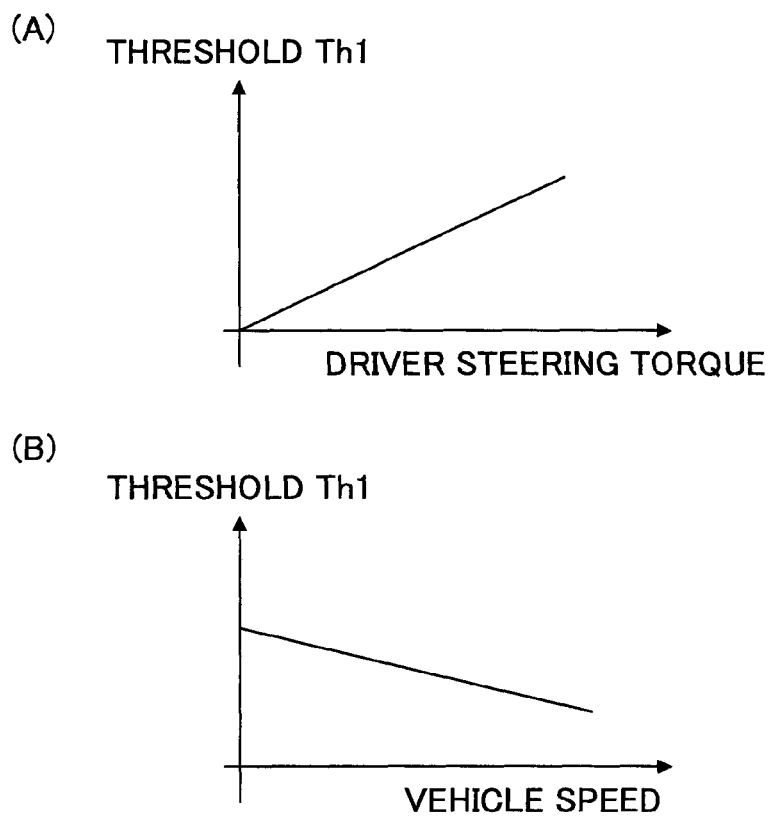
FIG. 5 (A) is a diagram for illustrating an example of a manner in which a predetermined threshold Th1 is varied according to the driver steering torque, and FIG. 5 (B) is a diagram for illustrating an example of a manner in which the predetermined threshold Th1 is varied according to a vehicle speed.

FIG. 5 (A) is a diagram for illustrating an example of a manner in which the predetermined threshold Th1 is varied according to the driver steering torque, and FIG. 5 (B) is a diagram for illustrating an example of a manner in which the predetermined threshold Th1 is varied according to a vehicle speed.

The predetermined threshold Th1 may be varied such that it increases as the driver steering torque increases as illustrated in FIG. 5 (A). This is because there is such a tendency that if the driver steering torque by the user becomes greater, it becomes more difficult for the user to perceive the operation of the steering actuator 16. It is noted that, in the example illustrated in FIG. 5 (A), the predetermined threshold Th1 increases linearly as the driver steering torque increases; however, the predetermined threshold Th1 may increase non-linearly as the driver steering torque increases. Further, in the example illustrated in FIG. 5 (A), the predetermined threshold Th1 is 0 when the driver steering torque is 0; however, the predetermined threshold Th1 may be greater than 0 when the driver steering torque is 0.

In this case, in step 400 in FIG. 4, for example, the controller 15 may determine the predetermined threshold Th1 according to the driver steering torque based on the driver steering torque information from the driver steering torque sensor 44 to use it for the determination process.

The predetermined threshold Th1 may be varied such that it increases as the vehicle speed decreases as illustrated in FIG. 5 (B). This is because there is such a tendency that the behavior of the vehicle more easily changes in a high-speed range with a less driver steering torque with respect to a low-speed range, and thus the operation of the steering actuator 16 is perceived by the user more easily in the high-speed range with respect to the low-speed range. It is noted that, in the example illustrated in FIG. 5 (B), the predetermined threshold Th1 decreases linearly as the vehicle speed increases; however, the predetermined threshold Th1 may decrease non-linearly as the vehicle speed increases.

In this case, in step 400 in FIG. 4, for example, the controller 15 may determine the predetermined threshold Th1 according to the vehicle speed based on the vehicle speed information from the vehicle speed sensor 13 to use it for the determination process. It is noted that the vehicle speed information may be derived based on a rpm of an output shaft of a transmission, a history of vehicle position measurements from a GNSS (global navigation satellite system) receiver, etc.

Figure 6:
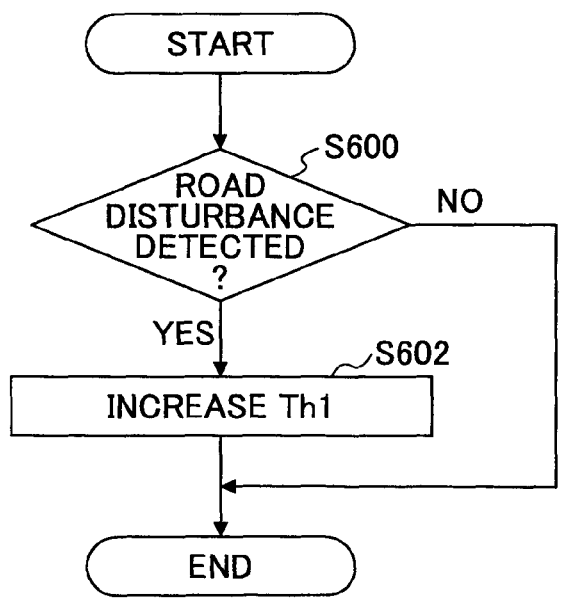
FIG. 6 is a flowchart for illustrating another example of the manner in which the predetermined threshold Th1 is varied.
Figure 7:
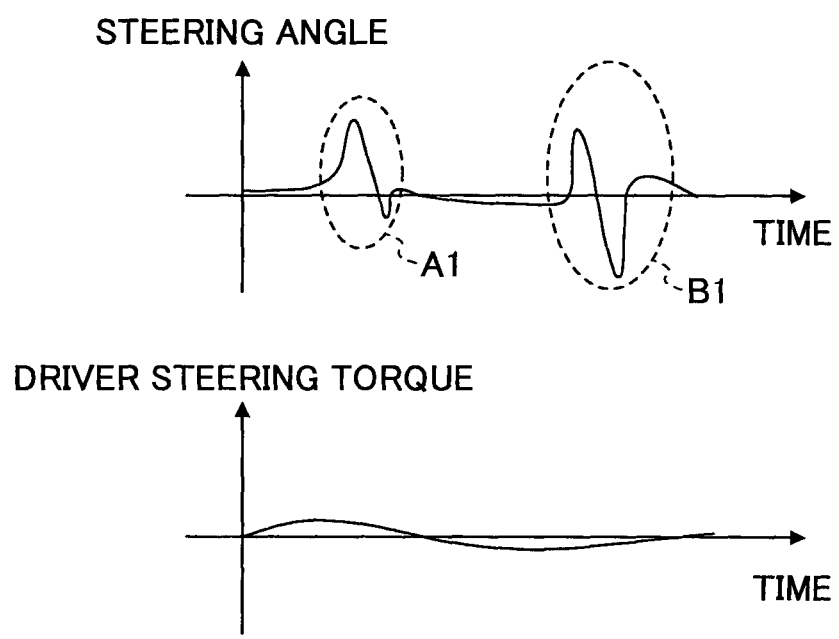
FIG. 7 is a diagram for explaining an example of a detection logic for a road disturbance.

FIG. 6 is a flowchart for illustrating another example of the manner in which the predetermined threshold Th1 is varied. FIG. 7 is a diagram for explaining an example of a detection logic for a road disturbance. In FIG. 7, respective wave shapes of the steering angle and the driver steering torque are illustrated in time series and in a synchronized manner. The process routine illustrated in FIG. 6 may be performed in parallel with the process illustrated in FIG. 4, for example.

In step 600, it is determined whether there is a road disturbance. The disturbance may be detected by any manners. For example, when there is the road disturbance, the steering torque changes greatly while the driver steering torque changes with a relatively small amount, as illustrated in wave shape parts A1 and A2 in FIG. 7. This is because, when the steered angel of the wheels are changed by the road disturbance, the steering angle changes correspondingly and instantaneously while the driver steering torque is less affected by the instantaneous change in the steering angle. Thus, the road disturbance may be detected by utilizing such a non-correlated characteristic (i.e., an independency between the steering angle and the driver steering torque). For example, it may be determined that there is a road disturbance when a state in which the steering angle changes by a value greater than or equal to a predetermined value under a situation where the change amount of the driver steering torque is less than a predetermined value. It is noted that the road disturbance may also be detected with an acceleration sensor for detecting accelerations in an up-and-down direction of the vehicle, etc. If there is a road disturbance, the process goes to step 602, otherwise the process ends without performed anything (in this case, the predetermined threshold Th1 may be remained as a predetermined default value, for example).

In step S210, the controller 15 increases the predetermined threshold Th1. For example, the predetermined threshold Th1 is increased by a predetermined amount with respect to the predetermined default value. The predetermined amount may be constant; however, the predetermined amount may be varied according to magnitude of the road disturbance. The predetermined threshold Th1 thus changed may be used for the determination process of step 400 in FIG. 4, for example.

According to the process illustrated in FIG. 6, the predetermined threshold Th1 is changed such that it increases if there is a road disturbance. The difference between the road disturbance and the operation of the steering actuator 16 is difficult for the user to perceive. Thus, during a period in which the road disturbance is detected, the predetermined threshold Th1 is changed to increase such that the output of the operation information is more easily prevented. As a result of this, the output of the operation information is restricted when such a road disturbance which cannot be perceived differently from the operation of the steering actuator 16 is detected, which can reduce strange feeling of the user.

It is noted that the predetermined threshold Th1 may be varied according to any combination of the parameters (the driver steering torque, the vehicle speed, the presence or absence of the road disturbance) described above.

Further, the parameters (the driver steering torque, the vehicle speed, the presence or absence of the road disturbance) described above may be considered in setting the predetermined operation information output preventing condition. In the case of considering the driver steering torque, for example, the predetermined operation information output preventing condition may be met when the control target value of the steering actuator 16 is less than the predetermined threshold Th1 and the driver steering torque is greater than a predetermined value. Alternatively, the predetermined operation information output preventing condition may be met when a steering torque (referred to as a control steering torque) generated by the steering actuator 16 according to the control target value is less than the driver steering torque and a difference between the control steering torque and the driver steering torque is greater than a predetermined value. Further, a ratio of magnitude between the control steering torque and the driver steering torque may be used instead of the difference between the control steering torque and the driver steering torque; Alternatively, more simply, the predetermined operation information output preventing condition may be met when the driver steering torque is greater than a predetermined value. With this arrangement, the control target value of the steering actuator 16 is not substantially considered (however, this is still based on a premise that the steering actuator 16 is being operated).

Figure 8:
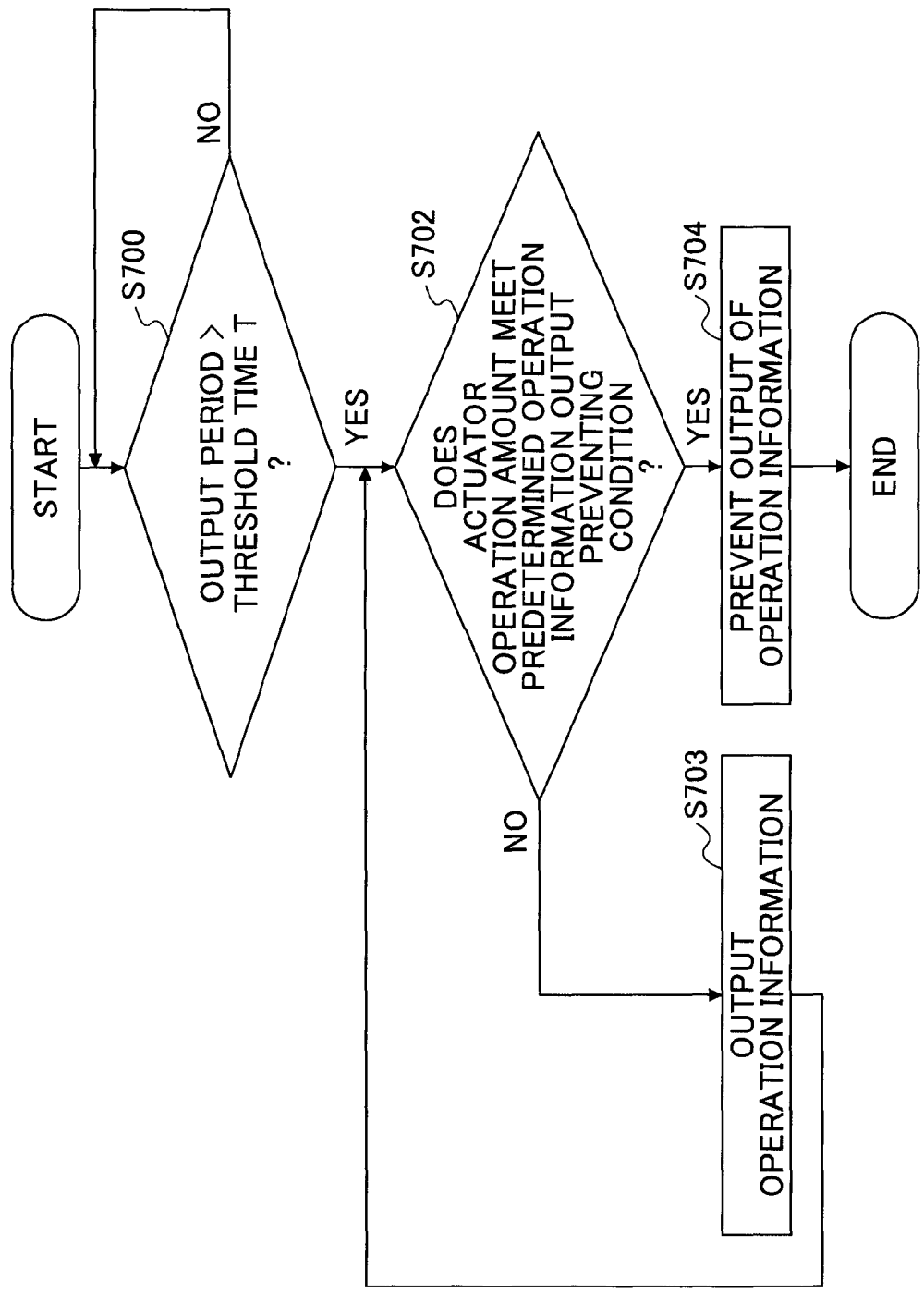
FIG. 8 a flowchart, for illustrating an example of an operation information output status continuing process executed by a controller 15.

FIG. 8 is an example of a flowchart of an operation information output status continuing process executed by the controller 15. The process illustrated in FIG. 8 may be initiated when the operation information is output by the process of step 302 in FIG. 3, for example, and then may be performed repeatedly every predetermined cycle, during the output of the operation information, until the output of the operation information is prevented (or the main switch 14 is turned off).

In step 700, the controller 15 determines whether an output period of the operation information exceeds a predetermined threshold time T. The output period of the operation information corresponds to a lapsed time lapsed from the timing when the operation information is output by the process of step 302 in FIG. 3. The predetermined threshold time T is determined in term of reducing the strange feeling due to the instantaneous output. In this case, the predetermined threshold time T may correspond to a lower limit value of the possible range of the output period of the operation information that can reduce strange feeling, and determined by adaptation. The predetermined threshold time T may be fixed or varied. For example, the predetermined threshold T may be varied according to the vehicle speed. In this case, the predetermined threshold T may be varied such that it becomes longer in the high-speed range with respect to the low-speed range. If the output period of the operation information exceeds the predetermined threshold time T, the process goes to step 702, otherwise the process becomes a waiting status (i.e., a status for waiting for a timing when the output period of the operation information exceeds the predetermined threshold time T).

In step 702, the controller 15 determines whether the operation amount of the steering actuator 16 meets the predetermined operation information output preventing condition, as is the case with the process of step 300 in FIG. 3. If the operation amount of the steering actuator 16 meets the predetermined operation information output preventing condition, the process goes to step 704, otherwise the process goes to step 703.

In step 703, the controller 15 keeps the output state of the operation information that represents the operated state of the steering actuator 16, and then executes the determination of step 702 again at the next process cycle.

In step 704, the controller 15 prevents the output of the operation information that represents the operated state of the steering actuator 16. It is noted that when the process has been performed, the output of the operation information becomes in the prevented state. Thus, when the process of step 704 ends, the process in FIG. 3 may be initiated again.

According to the process illustrated in FIG. 8, once the operation information is output by the process of step 300 in FIG. 3, the output state of the operation information is kept, even though the predetermined operation information output preventing condition is met immediately after that, for example, until the output period of the operation information exceeds the predetermined threshold time T. With this arrangement, at least such a situation where the output time of the operation information becomes excessively short is prevented, which can reduces the strange feeling of the user due to the instantaneous output of the operation information.

It is noted that, as a premise, the process of FIG. 8 is performed when the main switch 14 is in its ON state. When the main switch 14 is turned off during the process of FIG. 8, the lane keeping assist control is terminated at that timing. Thus, in this case, even if the output period of the operation information does not exceed the predetermined threshold time T at the timing when the main switch 14 is turned off, the operation information may become in a non-output state.

Figure 9:
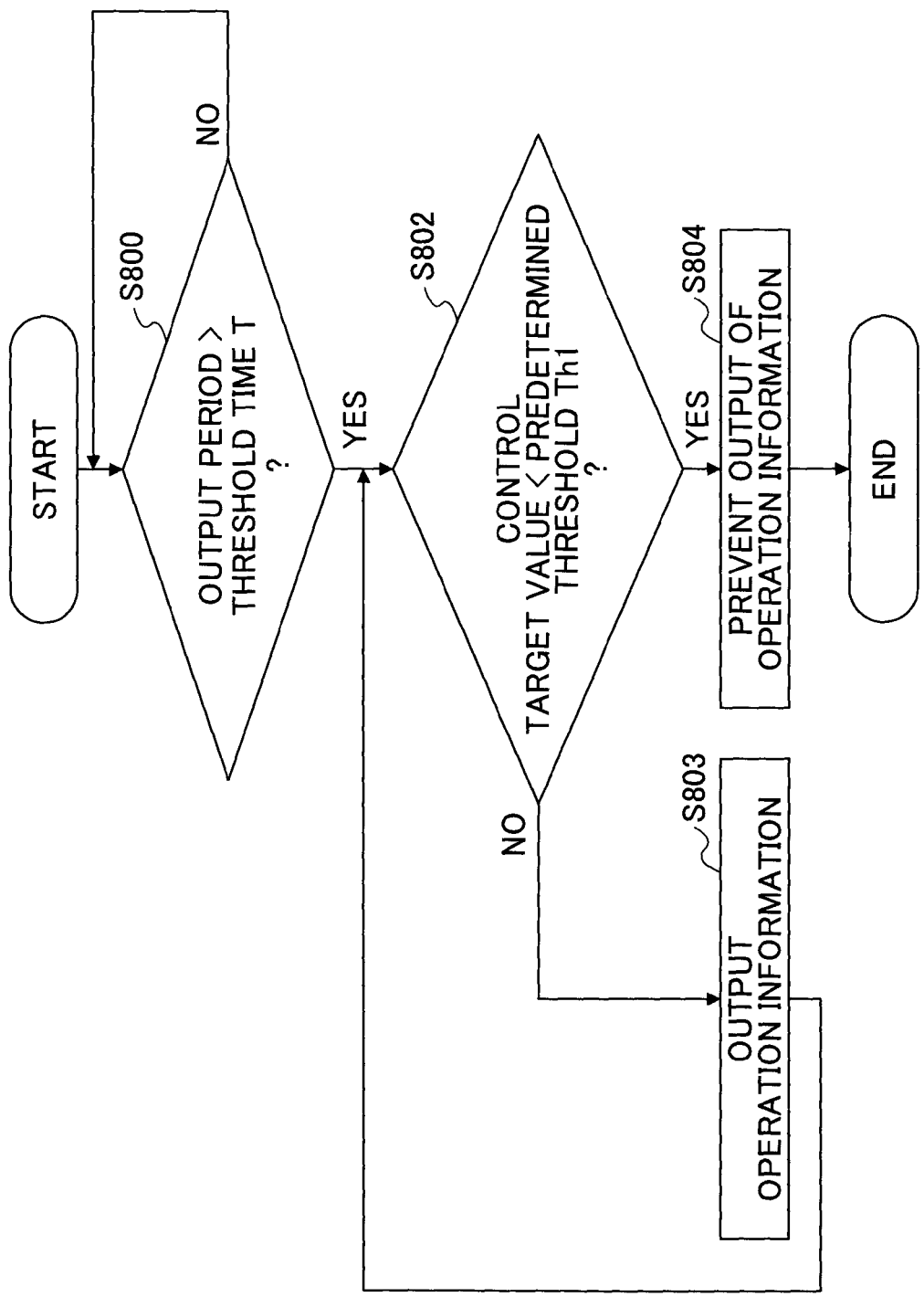
FIG. 9 is a flowchart for illustrating another example of the operation information output status continuing process executed by a controller 15.

FIG. 9 is a diagram for illustrating another example of the operation information output status continuing process executed by the controller 15. The process illustrated in FIG. 9 may be initiated when the operation information is output by the process of step 402 in FIG. 4, for example, and then may be performed repeatedly every predetermined cycle, during the output of the operation information, until the output of the operation information is prevented (or the main switch 14 is turned off).

In step 800, the controller 15 determines whether an output period of the operation information exceeds the predetermined threshold time T, as is the case with step 700 in FIG. 8. The output period of the operation information corresponds to a lapsed time lapsed from the timing when the operation information is output by the process of step 402 in FIG. 4. If the output period of the operation information exceeds the predetermined threshold time T, the process goes to step 802, otherwise the process becomes a waiting status (i.e., a status for waiting for a timing when the output period of the operation information exceeds the predetermined threshold time T).

In step 802, the controller 15 determines whether the control target value of the steering actuator 16 is less than a predetermined threshold Th1, as is the case with the process of step 400 in FIG. 4. The predetermined threshold Th1 may have the same value as the predetermined threshold Th1 used in the process of step 400 in FIG. 4. If the control target value of the steering actuator 16 is less than the predetermined threshold Th1, the process goes to step 804, otherwise the process goes to step 803.

In step 803, the controller 15 keeps the output state of the operation information that represents the operated state of the steering actuator 16, and then executes the determination of step 802 again at the next process cycle.

In step 804, the controller 15 prevents the output of the operation information that represents the operated state of the steering actuator 16. It is noted that when the process has been performed, the output of the operation information becomes in the prevented state. Thus, when the process of step 804 ends, the process in FIG. 4 may be initiated again.

According to the process illustrated in FIG. 9, once the operation information is output by the process of step 402 in FIG. 4, the output state of the operation information is kept, even though the control target value of the steering actuator 16 becomes less than the predetermined threshold Th1 immediately after that, for example, until the output period of the operation information exceeds the predetermined threshold time T. With this arrangement, because the output state of the operation information is kept for the predetermined threshold Th1, such a situation where the output time of the operation information becomes excessively short is prevented, which can reduces the strange feeling of the user due to the instantaneous output of the operation information.

FIG. 10 is a diagram for explaining the process in FIG. 9. In FIG. 10, (A) illustrates a comparative example in which a minimum output time of the operation information is not ensured, and (B) illustrates an example in which the minimum output time of the operation information is ensured by the process in FIG. 9.

In this comparative example, in the case where the control target value of the steering actuator 16 exceeds the predetermined threshold Th1 and thus the operation information is output, when the control target value of the steering actuator 16 becomes less than or equal to the predetermined threshold Th1 after that, the output of the operation information is prevented. Thus, according to the comparative example, once the operation information is output by the process of step 402 in FIG. 4, the output of the operation information is prevented when the control target value of the steering actuator 16 becomes less than the predetermined threshold Th1 immediately after that, for example. As a result of this, such a situation where the output time of the operation information becomes excessively short may occur, as illustrated in FIG. 10 (A).

In contrast, according to the process illustrated in FIG. 9, because the minimum output time of the operation information is ensured, the output state of the operation information is kept at least for the predetermined threshold time T, even if the control target value of the steering actuator 16 becomes less than the predetermined threshold Th1 immediately after the output of the operation information, illustrated in FIG. 10 (B). With this arrangement, such a situation where the output time of the operation information becomes excessively short is prevented, which can reduces the strange feeling of the user due to the instantaneous output of the operation information. However, if the instantaneous output of the operation information is permissible, it may be possible to adopt the configuration of the comparative example.

Figure 11:
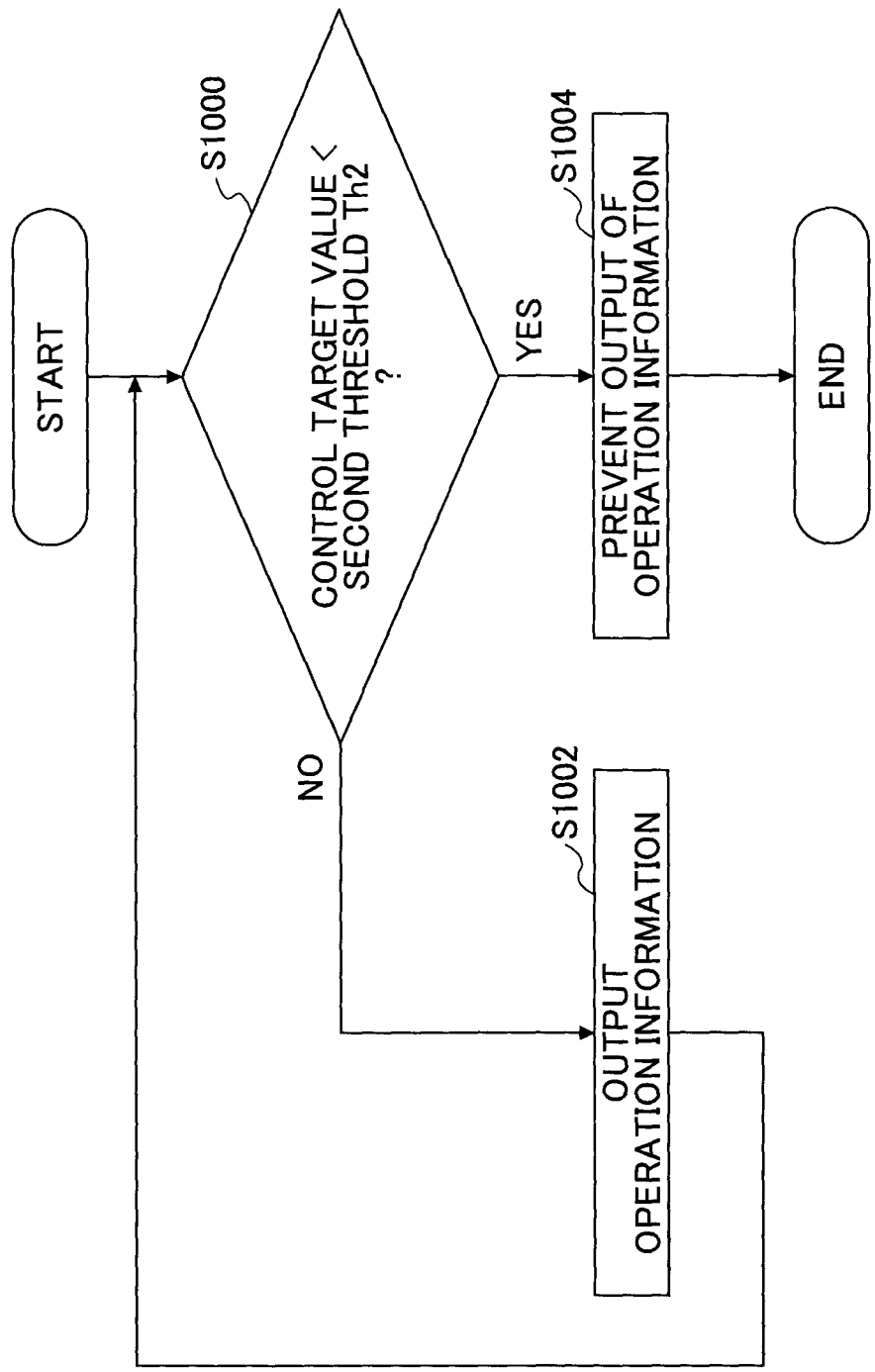
FIG. 11 is a flowchart for illustrating another example of the operation information output status continuing process executed by a controller 15.

FIG. 11 is a diagram for illustrating another example of the operation information output status continuing process executed by the controller 15. The process illustrated in FIG. 11 may be initiated when the operation information is output by the process of step 402 in FIG. 4, for example, and then may be performed repeatedly every predetermined cycle, during the output of the operation information, until the output of the operation information is prevented.

In step 1000, the controller 15 determines whether the control target value of the steering actuator 16 becomes less than or equal to a predetermined threshold Th2. The predetermined threshold Th2 is an arbitrary value less than the predetermined threshold Th1 used in the process of step 400 in FIG. 4, and may be 0 in an ultimate example. If the control target value of the steering actuator 16 becomes less than or equal to the predetermined threshold Th2, the process goes to step 1004, otherwise the process goes to step 1002.

In step 1002, the controller 15 keeps the output state of the operation information that represents the operated state of the steering actuator 16, and then executes the determination of step 1000 again at the next process cycle.

In step 1004, the controller 15 prevents the output of the operation information that represents the operated state of the steering actuator 16. It is noted that when the process has been performed, the output of the operation information becomes in the prevented state. Thus, when the process of step 1004 ends, the process in FIG. 4 may be initiated again.

According to the process illustrated in FIG. 11, once the operation information is output by the process of step 402 in FIG. 4, the output state of the operation information is kept, even though the control target value of the steering actuator 16 becomes less than the predetermined threshold Th1 immediately after that, for example, until the control target value of the steering actuator 16 becomes less than or equal to the predetermined threshold Th2. With this arrangement, because the threshold has a hysteresis characteristic, such a situation where the output time of the operation information becomes excessively short is prevented, which can reduces the strange feeling of the user due to the instantaneous output of the operation information.

Figure 12:
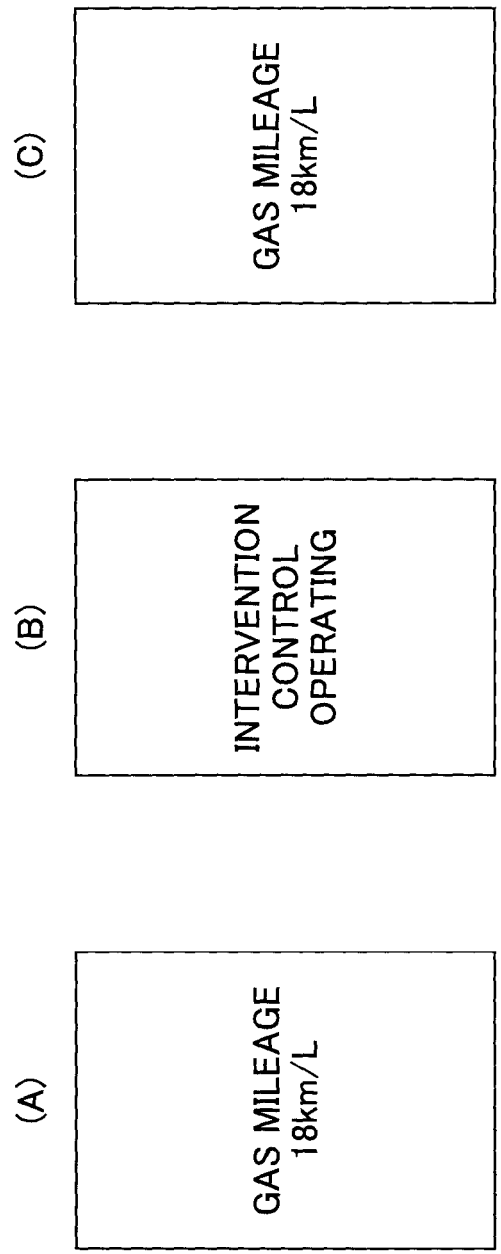
FIG. 12 is a diagram for illustrating an example of a way of outputting (displaying) the operation information on a meter 42.

FIG. 12 is a diagram for illustrating an example of a way of outputting (displaying) the operation information on the meter 42. In FIG. 12, (A) illustrates an example of a display on the meter 42 when the main switch 14 is in its OFF state, and (B) and (C) illustrate an example of a display on the meter 42 when the main switch 14 is in its ON state wherein (B) illustrates an example of the output state of the operation information, and (C) illustrates an example of the prevented state of the output of the operation information.

The operation information may be displayed in the same area (within the display area of the meter 42) as other information (gas mileage information in this example), as illustrated in FIG. 12. In this case, when the main switch 14 is in its OFF state, other information (gas mileage information in this example) may be displayed, as illustrated in FIG. 12 (A). On the other hand, under a situation where the main switch 14 is in its ON state, only the operation information, instead of other information (gas mileage information in this example), may be displayed (as an interrupt display) in the output state of the operation information, as illustrated in FIG. 12 (B). Further, under a situation where the main switch 14 is in its ON state, only other information (gas mileage information in this example), instead of the operation information, may be displayed in the prevented state of the output of the operation information, as illustrated in FIG. 12 (C). In other words, the same display state as illustrated in FIG. 12 (A) may be implemented.

In this way, according to the process illustrated in FIG. 12, the operation information and other information can be displayed in the same display area of the meter 42 by displaying the operation information as an interrupt display. Thus, it becomes possible to transmit more information to the driver by efficiently using the limited display area of the meter 42. However, a display area for only the operation information may be prepared.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, in the embodiments described above, the output of the operation information is prevented when the predetermined operation information output preventing condition is met; however, as an equivalent embodiment, the same effect can be obtained by permitting the output of the operation information only when a predetermined operation information outputting condition is met. In this case, the predetermined operation information outputting condition may be set conversely with respect to the operation information output preventing condition; however, the predetermined operation information outputting condition may be set in term of other factors. For example, the output of the operation information may be permitted when the control steering torque is greater than the driver steering torque, or when the magnitude of the difference between the control steering torque and the driver steering torque is less than a predetermined value.

Further, in the embodiments described above, a lane detecting part is implemented by the forward camera 11 and the white recognition device 12; however, the lane may be detected other apparatus such as a magnetic sensor, if a special infrastructure is developed, for example.

Further, in the embodiments described above, the lane keeping assist function is turned on when the main switch 14 is turned on; however, the lane keeping assist function may be turned on in other manners. For example, the lane keeping assist function may be automatically turned on when a predetermined condition is met. In this case, the main switch 14 may be omitted. Further, the main switch 14 may form the previous ON/OFF state or a predetermined default state (OFF state, for example) when an ignition switch is turned on.

Further, in the example illustrated in FIG. 1, the lane keeping assist apparatus 100 includes the steering actuator 16 and the brake actuator 17; however, one of the steering actuator 16 and the brake actuator 17 may be omitted. For example, even in the case of a vehicle which includes the steering actuator 16 and the brake actuator 17, there may be a configuration in which only the brake, actuator 17 is used for the intervention control and thus the steering actuator 16 is not used for the intervention control, and a configuration in which only the steering actuator 16 is used for the intervention control and thus the brake actuator 17 is not used for the intervention control. Similarly, in the example illustrated in FIG. 1, the lane keeping assist apparatus 100 includes the buzzer 40 and the meter 42; however, one of the buzzer 40 and the meter 42 may be omitted.

The present application is based on Japanese Priority Application No. 2013-151947, filed on Jul. 22, 2013, the entire contents of which are hereby incorporated by reference.

The invention claimed is:

1. A lane keeping assist apparatus, comprising:
a lane detecting part configured to detect a lane in which a vehicle travels;
an actuator configured to generate a force for changing an orientation of the vehicle; and
a controller configured to operate the actuator such that the vehicle travels within the lane under a situation where a lane keeping assist function is in its ON state, wherein
under a situation where the controller is operating the actuator to generate a force to travel within the lane during the lane keeping assist function, the controller determines whether an operation amount of the actuator is less than a predetermined first threshold, and prevents an output of operation information if it determines that the operation amount of the actuator is less than the predetermined first threshold, the operation information representing an operated state of the actuator.

2. The lane keeping assist apparatus of claim 1, wherein the controller cancels a prevented state of the output of the operation information when the operation amount of the actuator becomes greater than or equal to the predetermined first threshold, under the situation where the controller is operating the actuator.

3. The lane keeping assist apparatus of claim 2, wherein the controller, when it cancels the prevented state of the output of the operation information, keeps a canceled state at least for a predetermined period.

4. The lane keeping assist apparatus of claim 3, wherein the controller, when the lane keeping assist function is turned off in the canceled state, stops the canceled state and forms a non-output state of the operation information.

5. The lane keeping assist apparatus of claim 2, wherein even if the operation amount of the actuator becomes less than the predetermined first threshold after the controller cancels a prevented state of the output of the operation information, the controller keeps a canceled state until the operation amount of the actuator becomes less than or equal to a predetermined second threshold, which is less than the predetermined first threshold.

6. The lane keeping assist apparatus of claim 1, wherein the predetermined first threshold is varied based on at least one of a driver steering torque at a time of a steering operation by a driver, a reaction force transmitted from a road surface to a steering shaft, and a vehicle speed.

* * * * *